United States Patent
Pigott

(10) Patent No.: US 8,026,700 B1
(45) Date of Patent: Sep. 27, 2011

(54) DC TO DC CONVERTER HAVING SWITCH CONTROL AND METHOD OF OPERATION

(75) Inventor: John M. Pigott, Phoenix, AZ (US)

(73) Assignee: Freescale Semiconductor, Inc., Austin, TX (US)

(*) Notice: Subject to any disclaimer, the term of this patent is extended or adjusted under 35 U.S.C. 154(b) by 7 days.

(21) Appl. No.: 12/723,223

(22) Filed: Mar. 12, 2010

(51) Int. Cl.
*G05F 1/00* (2006.01)
(52) U.S. Cl. .......... 323/222; 323/288; 323/283
(58) Field of Classification Search .......... 323/222, 323/283, 288
See application file for complete search history.

(56) References Cited

U.S. PATENT DOCUMENTS

| | | | | |
|---|---|---|---|---|
| 4,536,700 | A * | 8/1985 | Bello et al. | ........ 323/285 |
| 6,366,066 | B1 | 4/2002 | Wilcox | |
| 6,956,361 | B1 | 10/2005 | Mozipo et al. | |
| 7,612,543 | B2 * | 11/2009 | Yu et al. | ........ 323/222 |
| 2009/0251117 | A1 | 10/2009 | Pigott | |

OTHER PUBLICATIONS

ZL2006 Data Sheet; Intersil Zilker Labs; Feb. 18, 2009; 45 pages.

* cited by examiner

*Primary Examiner* — Shawn Riley
(74) *Attorney, Agent, or Firm* — James L. Clingan, Jr.

(57) ABSTRACT

In a D.C. to D.C. converter, an input voltage is received via an inductor at an input terminal and stored onto a capacitor of an integrator. A first switch is coupled between the input terminal and a reference terminal such as ground and thereby fluxes the inductor. The input voltage stored on the capacitor falls at a rate determined by the integrator circuit and an initial value of the input voltage. After a time duration, the first switch becomes nonconductive. Current flows from the inductor through a diode to an output terminal until a second switch across the diode is made conductive. Stored voltage on the capacitor of the integrator increases in response to the second switch being conductive. The stored voltage on the capacitor is continuously compared with a reference voltage. The second switch is made nonconductive when the stored voltage on the capacitor exceeds the reference voltage.

20 Claims, 2 Drawing Sheets

DC TO DC CONVERTER HAVING SWITCH CONTROL AND METHOD OF OPERATION

RELATED APPLICATION

This application is related to U.S. application Ser. No. 12/723,239, titled "DC to DC CONVERTER HAVING ABILITY OF SWITCHING BETWEEN CONTINUOUS AND DISCONTINUOUS MODES AND METHOD OF OPERATION," by Pigott et al., assigned to the assignee hereof, and filed on even date herewith.

BACKGROUND

1. Field

This disclosure relates generally to DC to DC to converters, and more specifically, to DC to DC converters having switch control.

2. Related Art

DC to DC converters have an important role in systems because it is not uncommon for the power supply that is available to have a wide voltage range. Because the power supply may be a battery, it is desirable that the DC to DC converter perform its conversion efficiently. Efficiency is reduced by any power used by the DC to DC converter itself. Thus, for increasing efficiency, it is desirable to eliminate or reduce any power consumed during the conversion. Typically a diode is used in the conversion process but any current passing through the diode is a loss of power due to the voltage drop of about 0.7 volt of a forward biased PN junction. Attempts have been made to eliminate this diode drop by using a switched transistor, but timing of the transistor is very critical for proper operation. If the transistor is conductive for too long, current can actually flow from the output back to the converter. If the transistor is becomes non-conductive too soon, power is wasted through the diode.

Thus, there is a need to eliminate or improve upon the issues raised above in performing a DC to DC conversion.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

In one aspect a DC to DC converter has a switch in parallel with a diode that is used to bypass the diode to improve efficiency. Connections are present for an inductor in which current is to be passed through the inductor and corresponding energy stored in the inductor which lasts for a first duration. The energy, in the form of current, is then coupled through the diode and, after a very short delay, through the switch to provide current at the output voltage. The timing of the switch becoming non-conductive is important to the efficiency of the converter and is achieved using an RC integrator that computes both the time of storing energy in the inductor and the time that the inductor provides current to the output. This is better understood by reference to the following description and the drawings.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Figure 1:
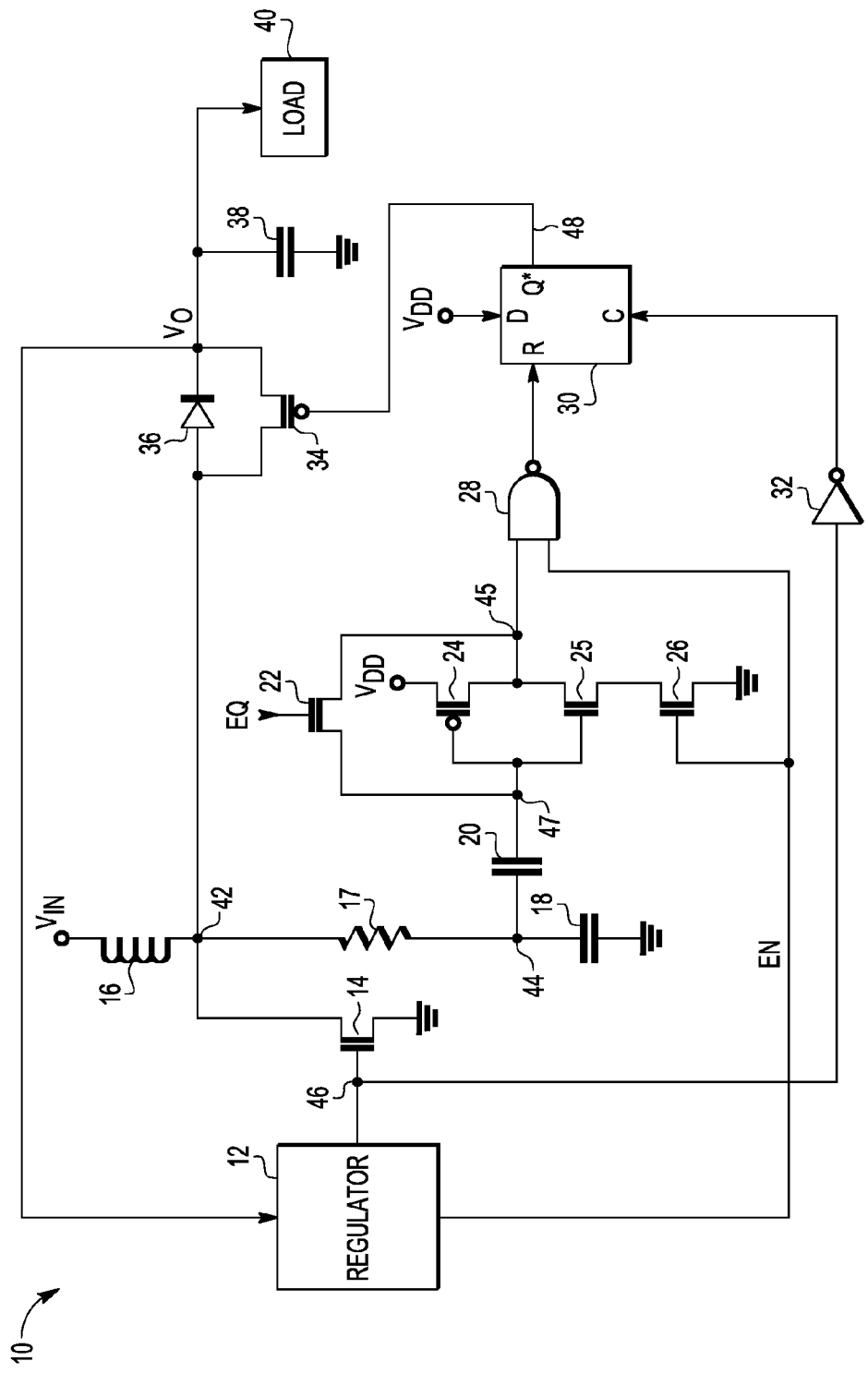
FIG. 1 is a circuit diagram of an embodiment.

Shown in FIG. 1 is a DC to DC converter 10 having a regulator 12, an N channel transistor 14, an inductor 16, a resistor 17, a capacitor 18, a capacitor 20, an N channel transistor 22, a P channel transistor 24, an N channel transistor 25, an N channel transistor 26, an NAND gate 28, a D flip-flop 30, an inverter 32, a P channel transistor 34, a diode 36, a capacitor 38, and a load 40. Regulator 12 has an input connected to an output Vo of converter 10, a first output connected to a node 46, and a second output providing an enable signal EN. Transistor 14 has a control electrode connected to node 46, a source connected to ground, and a drain connected to a node 42. Inductor 16 has a first terminal for receiving a power supply voltage Vin and a second terminal connected to node 42. Resistor 17 has a first terminal connected to node 42 and a second terminal connected to a node 44. Capacitor 18 has a first terminal connected to node 44 and a second terminal connected to ground. Capacitor 20 has a first terminal connected to node 44 and a second terminal connected to node 47. Transistor 22 has a first current electrode connected to the second terminal of capacitor, a control electrode for receiving an equalization signal EQ, and a second current electrode connected to a node 45. Transistor 24 has a source connected to a power supply terminal VDD, a control electrode connected to the second terminal of capacitor 20, and a drain connected to a node 45. Transistor 25 has a drain connected to node 45, a gate connected to the second terminal of capacitor 20, and a source. Transistor 26 has a drain connected to the source of transistor 25, a control electrode for receiving the enable signal, and a source connected to ground. NAND gate 28 has a first input connected to node 45, a second input for receiving the enable signal EN, and an output. D flip-flop 30 has a reset R input connected to the output of NAND gate 28, a D input connected to power supply terminal VDD, an output Q*, and a clock input C. Inverter 32 has an input connected to node 46 and an output connected to the clock input C of D flip-flop 30. Transistor 34 has a gate connected to the output Q* of flip-flop 30, a first current electrode connected to node 42, and a second current electrode connected to output Vo. A diode has an anode connected to node 42 and a cathode connected to output Vo. Capacitor 38 has a first terminal connected to output Vo and a second terminal connected to ground. Load 40 is connected to output Vo.

In operation, inductor 16 first stores energy while transistor 14 is conductive and then provides current based on its stored energy to output Vo. This process repeats at a rate commensurate with the power demands of load 40. At a time prior to inductor 16 storing energy, transistors 14 and 34 are non-conductive. In this condition, power to load 40 is being supplied by charge stored in capacitor 38.

Figure 2:
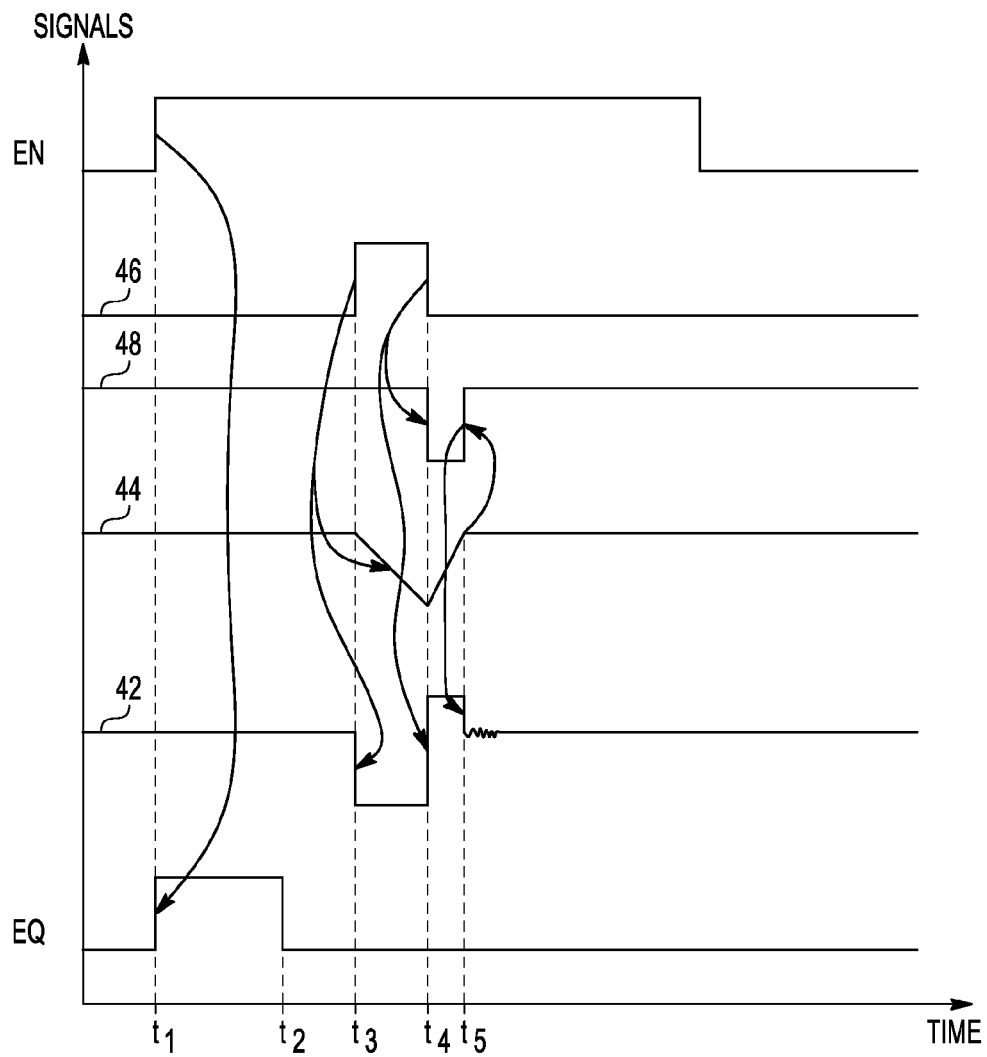
FIG. 2 is a timing diagram helpful in understanding the operation of the embodiment of FIG. 1.

In order to maintain the voltage level at output Vo at the desired level, a next charging phase is begun by regulator 12, which senses output Vo, generating enable signal EN. This is shown as occurring at time t1 in FIG. 1. Enable signal EN being generated causes transistor 26 to be conductive and NAND gate 28 to be responsive to its first input. Transistors 24 and 25 form an inverting amplifier that is enabled when transistor 26 is conductive. The inverting amplifier is used as a detector circuit. Prior to enable signal EN being generated, there is no current flowing through inductor 16 so that node 42 is at Vin as is node 44. When enable signal EN is generated at time t1, equalization signal EQ responds to being enabled by transitioning from a logic low to a logic high at substantially time t1. Equalization signal EQ at a logic high causes transistor 22 to be conductive so that nodes 45 and 47 are coupled together. Thus the input of inverting amplifier at node 47 and the output of inverting amplifier at node 45 is equalized. This configuration of the output of an inverting amplifier being applied to the input is called autozero. In this configuration the voltage at nodes 45 and 47 is at the switch point of the inverting amplifier, which is the point at which any increase in the input voltage will result in the input being recognized as a logic high and any decrease in the input voltage will result in the input being recognized as a logic low. The voltage at node 44 may have been affected by node 45 and 47 being coupled together so that equalization signal EQ is maintained at a logic high sufficiently long for node 44 to reach the level of power supply voltage Vin, the condition at which no current is flowing at node 42. After this sufficient time for node 44 to substantially reach voltage Vin, equalization signal EQ is switched to a logic low, at time t2 as shown in FIG. 2, by regulator 12 to cause transistor 22 to be non-conductive and leaving node 47 in a floating condition. In this condition of node 44 being at voltage Vin and node 47 being precharged at the switch point of the detection circuit, a reference voltage is established across capacitor 20.

After equalization signal EQ switches to a logic low, regulator 12 generates an energize signal at node 46 shown as occurring at time t3 in FIG. 2. This causes inverter 32 to transition its output, which is coupled to the clock input of D flip-flop 30, from a logic high to a logic low. D flip-flop 30 is positive edge triggered so D flip-flop 30 is non-responsive to this logic high to logic low transition so that the output at node 48 remains at a logic high which keeps transistor 34 non-conductive. The logic high at node 46 causes transistor 14 to become conductive causing node 42 to switch to a logic low as shown in FIG. 2. With node 42 being at a logic low, current enters inductor 16 where energy is stored. Node 42 at a logic low causes charge to flow out from capacitor 18 at a rate based upon the resistance (R) of resistor 17 and the capacitance (C) of capacitor 18. This is commonly called the RC time constant. Thus capacitor 18 is being discharged at a rate based upon the RC time constant. As node 44 reduces in voltage, as shown in FIG. 2 beginning substantially at time t3, node 47, which is floating, reduces in voltage by the same amount. The voltage across capacitor 20 remains substantially constant, thus functioning as an autozero capacitor, so that node 47 drops at the same rate as node 44. This ensures that node 47 is below the switch point of the detector made of transistors 24 and 25. Thus node 45 is at a logic high which means that the R input of D flip-flop 30 is at a logic low. Capacitor 44 will continue to discharge until regulator 12 changes the signal at node 46 to a logic low.

The transition of the signal at node 46, which is shown in FIG. 2 as occurring at a time t4, to a logic low causes transistor 14 to become non-conductive and inverter 32 to transition the clock input of D flip-flop 30 to a logic high. This positive edge of the clock input causes the Q* output of D flip-flop 30 to output the inverse of the signal at its D input. The D input is at a logic high due to being connected to positive power supply terminal VDD. Thus the Q* output transitions to a logic low which causes transistor 34 to become conductive. Transistor 34 thus has the affect of bypassing diode 36 and avoiding the extra voltage drop caused by a forward biased PN junction.

Because transistor 46 becomes non-conductive before transistor 34 becomes conductive, current supplied from inductor 26 initially passes through diode 38 and thus the initial voltage at node 42 at time t4 is a diode drop above the output voltage Vo. After the necessary transitions through inverter 32 and D flip-flop 30, transistor 34 bypasses diode 36 so that the voltage at node 42 is substantially the same as the output voltage Vo. With the voltage at node 42 at output voltage Vo, the voltage at node 44 begins to rise at substantially time t4 as shown in FIG. 2. The voltage at node 44 continues to rise causing node 47 to also rise at the same rate. When node 44 reaches the level of voltage Vin, node 47 reaches the switch point of the detector of transistors 24 and 25. The voltage across capacitor 29 remains unchanged because node 47 is floating. When the voltage at node 47 reaches the switch point or perhaps slightly exceeds it, the output of the detector at node 45 switches from a logic high to a logic low. NAND gate 28, with the enable signal EN still a logic high, switches its output from a logic low to a logic high. This results in the R input of flip-flop 30 switching to a logic high which causes flip-flop 30 to reset its Q* output to a logic low. The logic low output from flip-flop 30 causes transistor 36 to become non-conductive. Any additional stored energy in inductor 16 passes through diode 36. After a predetermined time sufficient so that, preferably, inductor 16 is not supplying current through diode 36, enable signal EN is transitioned to a logic low. Enable signal at a logic low disables the detector and causes NAND gate 28 to provide a logic high output. In such case D flip-flop 30 is held in the reset condition which is the condition where a logic low is output to transistor 34 and thus holding transistor 34 in the non-conductive state.

Capacitor 18 and resistor 17 function as an integrator so that the voltage change from Vin to a low value, preferably ground, is integrated as a first integration. Capacitor 18 and resistor 17 are not a perfect integrator but operating over a time that is substantially shorter than the RC time constant provides a very good approximation of integration. Thus the capacitance of capacitor 18 and the resistance of resistor 17 are chosen to ensure this is the case. A second integration is performed in reverse when the voltage level at node 42 is at the level of the output voltage Vo. By using the same resistance and capacitance connected to inductor 16 for both integrations, there is no error introduced by variation in those values. The first integration is a measure of the current flowing in inductor 16 based on the time the voltage at node 42 is at ground. The second integration is a measure of the current that is flowing to the output to maintain the output voltage of Vo for load 40. If transistor 34 stays conductive too long, current will actually reverse and begin flowing back to node 42 which is a waste of power. Diode 36, with transistor 34 non-conductive, prevents this reverse flow. Diode 36, however, wastes power when current is passing through it from node 42 to the output. Thus it is beneficial for transistor 34 to be conductive as long as current is passing from node 42 to the output. The return of node 44 to the level of voltage Vin indicates that the inductor current has substantially reached zero and thus it is time to make transistor 34 non-conductive. The return of node 44 to the level of voltage Vin is detected at node 47 by transistors 24 and 25 and propagated through NAND gate 28 to flip-flop 30. Flip-flop 30 responds by transitioning the signal at node 48 from a logic low to a logic high at time t5 as shown in FIG. 2 which causes transistor 34 to become non-conductive. Due to the use of an RC time constant for the integrator, when the output voltage is substantially greater than the input voltage, the net effect of the first and second integration is that the node 42 returns to the level of Vin a little before the stored energy has been completely transferred which has the effect of easily ensuring that transistor 34 is non-conductive before all of the stored energy has been transferred. Upon transistor 34 becoming non-conductive, node 42 will respond with a small amount of ringing as shown in FIG. 2.

Transistors 24 and 25 operate as a detector as to when node 47 has reached the switch point of that inverting amplifier formed by those two transistors and enabled by transistor 26. Capacitor 20 stores a voltage which is the difference between the voltage at Vin and the switch point of the inverting amplifier. The effect is that node 47 begins at the switch point, follows the voltage drop on node 44, and then follows the rise in voltage on node 44. Thus, node 47 reaches the switch point when node 44 returns to the level of Vin. Thus, capacitor 20 and transistors 24 and 25 function as a detector when the voltage at node 44 crosses the level of voltage Vin. Transistor 22 is useful in establishing initial conditions for detecting the transition of node 44 across the level of Vin.

Figure 3:
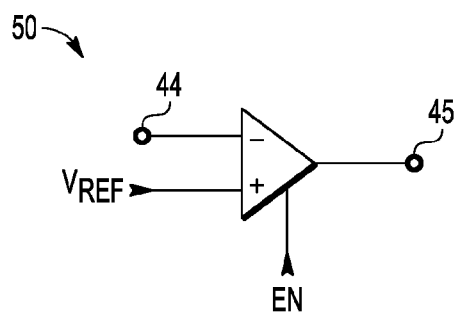
FIG. 3 is a circuit diagram of a circuit element that may be used in the embodiment of FIG. 1.

An alternative and perhaps more general approach is shown in FIG. 3 comprising a comparator 50 that can function as the detector circuit of transistors 22, 24, 25, and 26 and capacitor 20. Comparator 50 has an inverting input coupled to node 44 of FIG. 1, a non-inverting input coupled to a reference voltage Vref, and enable input for receiving enable signal EN of FIG. 1, and an output coupled to node 45. Reference voltage Vref can be voltage Vin. In such case, when node 44 is below Vin and the enable signal is active, comparator 50 outputs a logic high on node 45. When node 44 rises and reaches the level of voltage Vin, comparator 50 transitions its output to a logic low. This is the same functional operation as for the detector circuit of 22, 24, 25, and 26 and capacitor 20. For comparator 50 of FIG. 3, a different reference voltage than the level of voltage Vin may be effective.

Thus, DC to DC converter 10 provides a very efficient control of transistor 34 so that there is very little time during which current passes through diode 36. Diode 36 remains useful for ensuring that a current path is always available from node 42 to Vo to allow some margin in timing the conductivity of transistor 34.

By now it should be appreciated that there has been provided a D.C. to D.C. converter. The D.C. to D.C. converter includes an input terminal for receiving a first terminal of an inductor, the inductor having a second terminal for receiving an input voltage. The DC to DC converter further includes a first switch having a first terminal coupled to a first node, a second terminal coupled to a first reference terminal and a control terminal. The DC to DC converter further includes a regulator coupled to the control terminal of the first switch for regulating conduction of the first switch. The DC to DC converter further includes diode means coupled between the first node and an output terminal for providing current flow only from the first node to the output terminal. The DC to DC converter further includes a second switch having a first terminal coupled to the first node, a control terminal, and a second terminal coupled to the output terminal, the second switch selectively short circuiting the diode means. The DC to DC converter further includes an integrator coupled between the first node and a second reference terminal, the integrator having an output. The DC to DC converter further includes detector means coupled to the output of the integrator for detecting when voltage at the output of the integrator exceeds a reference voltage, and having an output. The DC to DC converter further includes logic circuitry having an input coupled to the output of the detector means and an output coupled to the control terminal of the second switch, the logic circuitry making the second switch conductive in response to the first switch becoming nonconductive and making the second switch nonconductive in response to the output of the detector means. The DC to DC converter may have a further characterization by which the reference voltage is a voltage at the output of the integrator when the first switch first becomes conductive. The DC to DC converter may have a further characterization by which the detector means comprises a first transistor of a first conductivity type having a first current electrode coupled to a power supply voltage terminal, a control electrode, and a second current electrode; a second transistor of a second conductivity type opposite the first conductivity type having a first current electrode coupled to the second current electrode of the first transistor, a control electrode coupled to the control electrode of the first transistor, and a second current electrode coupled to a ground terminal; a third transistor having a first current electrode coupled to the control electrode of the first transistor, a second current electrode coupled to the second current electrode of the first transistor, and a control electrode for receiving an equalization control signal; a logic gate having a first input coupled to the second current electrode of the first transistor, a second input for receiving an enable signal, and an output coupled to the input of the logic circuitry; and a capacitor having a first electrode coupled to the output of the integrator and a second electrode coupled to the control electrode of the first transistor. The DC to DC converter may further comprise a fourth transistor of the second conductivity type having a first current electrode coupled to the second current electrode of the second transistor, a control electrode coupled to the regulator, and a second current electrode coupled to the ground terminal. The DC to DC converter may have a further characterization by which wherein the detector means comprises a comparator circuit having a first input coupled to the reference voltage, a second input coupled to the output of the integrator, and an output terminal for providing the output of the detector means. The DC to DC converter may have a further characterization by which the logic circuitry comprises a flip-flop circuit having a clock input coupled to the regulator, a data input coupled to a power supply voltage terminal, a reset input coupled to the output of the detector means, and an output coupled to the control terminal of the second switch. The DC to DC converter may have a further characterization by which the integrator comprises a resistor having a first terminal coupled to the input terminal and having a second terminal; and a capacitor having a first electrode coupled to the second terminal of the resistor and a second electrode coupled to the second reference terminal.

Also disclosed is a method. The method includes receiving an input voltage via an inductor at an input terminal. The method also includes storing the input voltage onto a capacitor of an integrator circuit. The method also includes making a first switch conductive, the first switch being coupled between the input terminal and a ground, and thereby fluxing the inductor. The method also includes making the input voltage stored on the capacitor fall at a rate determined by the integrator circuit and an initial value of the input voltage. The method also includes flowing current from the inductor through a diode to an output terminal for providing an output voltage until a second switch across the diode is made conductive. The method also includes increasing stored voltage on the capacitor of the integrator in response to the second switch being conductive at a rate that is proportional to the output voltage minus the input voltage. The method also includes continuously comparing the stored voltage on the capacitor with a reference voltage. The method also includes making the second switch nonconductive when the stored voltage on the capacitor reaches and begins to exceed the reference voltage. The method may further include reducing voltage across the inductor by a diode voltage drop when the second switch is conducting. The method may further include controlling the time duration by a regulator circuit coupled to the first switch. The method may further include enabling a comparator for the continuously comparing by providing an enable signal from the regulator circuit prior to making the first switch conductive. The method may further include implementing the continuously comparing with an autozero capacitor coupled to an inverter which is coupled to a logic gate, the inverter having an equalization transistor selectively coupled between an input and an output thereof for setting a trip point voltage of the inverter to the input voltage. The method may have a further characterization by which implementing the continuously comparing with a comparator circuit coupled to a logic gate, the comparator circuit having a first input coupled to a reference terminal for receiving the reference voltage, a second input coupled to the capacitor of the integrator circuit and having an output coupled to the logic gate. The method may further include coupling a flip-flop between detection circuitry and the second switch, the flip-flop being reset when stored voltage on the capacitor reaches and exceeds the reference voltage to provide a control signal for biasing the second switch.

Disclosed also is a DC to DC converter having a an input terminal for receiving a first terminal of an inductor, the inductor having a second terminal for receiving an input voltage. The DC to DC converter also includes a first transistor switch having a first current electrode coupled to a first node, a second current electrode coupled to a ground terminal and a control terminal. The DC to DC converter also includes a regulator coupled to the control terminal of the first transistor switch for regulating conduction of the first switch. The DC to DC converter also includes a diode having a cathode coupled to the first node and an anode coupled to an output terminal for providing current flow only from the first node to the output terminal. The DC to DC converter also includes a second transistor switch having a first current electrode coupled to the cathode of the diode, a control terminal, and a second current electrode coupled to the anode of the diode, the second transistor switch selectively short circuiting the diode. The DC to DC converter also includes an RC integrator coupled between the first node and the ground terminal, the RC integrator having an output. The DC to DC converter also includes a detector coupled to the output of the RC integrator for detecting when voltage at the output of the RC integrator exceeds a reference voltage, and having an output. The DC to DC converter also includes a flip-flop having an input coupled to the output of the detector and an output coupled to the control terminal of the second transistor switch, the flip-flop making the second transistor switch conductive in response to the first transistor switch becoming nonconductive and making the second transistor switch nonconductive in response to determining when capacitor voltage in the RC integrator exceeds the reference voltage. The DC to DC converter may have a further characterization by which detector comprises: a capacitor having a first electrode coupled to the output of the RC integrator, and having a second electrode; a P-channel transistor having a first current electrode coupled to a power supply voltage terminal, a gate coupled to the second electrode of the capacitor, and a second current electrode coupled to a node; a first N-channel transistor having a first current electrode coupled to the second current electrode of the P-channel transistor at the node, a gate coupled to the gate of the P-channel transistor, and a second current electrode; a second N-channel transistor having a first current electrode coupled to the second current electrode of the first N-channel transistor, a gate coupled to the regulator, and a second current electrode coupled to the ground terminal; and a logic gate having a first input coupled to the node, a second input coupled to the regulator, and an output coupled to a reset input of the flip-flop. The DC to DC converter may have a further characterization by which the reference voltage is a voltage at the output of the RC integrator when the first switch first becomes conductive. The DC to DC converter may have a further characterization by which detector comprises: a comparator circuit having a first input coupled to the output of the RC integrator, a second input for receiving the reference voltage, a third input coupled to the regulator for receiving an enable signal, and an output; and a logic gate having a first input coupled to the output of the detector, a second input coupled to the regulator for receiving the enable signal and an output coupled to the input of the flip-flop. The DC to DC converter may have a further characterization by which the input of the flip-flop is a reset input. The DC to DC converter may have a further characterization by which the RC integrator comprises: a resistor having a first terminal coupled to the input terminal and having a second terminal; and a capacitor having a first electrode coupled to the second terminal of the resistor at the output of the integrator, the capacitor having a second electrode coupled to the ground terminal.

Although the invention is described herein with reference to specific embodiments, various modifications and changes can be made without departing from the scope of the present invention as set forth in the claims below. For example, an RC integrator was disclosed but another integrator may be effective. Also at least some portions of the logic may be reversed and NAND gate 28 could then be some other type of logic gate such as a NOR gate. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A D.C. to D.C. converter, comprising:
an input terminal for receiving a first terminal of an inductor, the inductor having a second terminal for receiving an input voltage;
a first switch having a first terminal coupled to a first node, a second terminal coupled to a first reference terminal and a control terminal;
a regulator coupled to the control terminal of the first switch for regulating conduction of the first switch;
diode means coupled between the first node and an output terminal for providing current flow only from the first node to the output terminal;

a second switch having a first terminal coupled to the first node, a control terminal, and a second terminal coupled to the output terminal, the second switch selectively short circuiting the diode means;

an integrator coupled between the first node and a second reference terminal, the integrator having an output;

detector means coupled to the output of the integrator for detecting when voltage at the output of the integrator exceeds a reference voltage, and having an output; and logic circuitry having an input coupled to the output of the detector means and an output coupled to the control terminal of the second switch, the logic circuitry making the second switch conductive in response to the first switch becoming nonconductive and making the second switch nonconductive in response to the output of the detector means.

2. The D.C. to D.C. converter of claim 1 wherein the reference voltage is voltage at the output of the integrator when the first switch first becomes conductive.

3. The D.C. to D.C. converter of claim 1 wherein the detector means comprises:

a first transistor of a first conductivity type having a first current electrode coupled to a power supply voltage terminal, a control electrode, and a second current electrode;

a second transistor of a second conductivity type opposite the first conductivity type having a first current electrode coupled to the second current electrode of the first transistor, a control electrode coupled to the control electrode of the first transistor, and a second current electrode coupled to a ground terminal;

a third transistor having a first current electrode coupled to the control electrode of the first transistor, a second current electrode coupled to the second current electrode of the first transistor, and a control electrode for receiving an equalization control signal;

a logic gate having a first input coupled to the second current electrode of the first transistor, a second input for receiving an enable signal, and an output coupled to the input of the logic circuitry; and a capacitor having a first electrode coupled to the output of the integrator and a second electrode coupled to the control electrode of the first transistor.

4. The D.C. to D.C. converter of claim 3 further comprising:

a fourth transistor of the second conductivity type having a first current electrode coupled to the second current electrode of the second transistor, a control electrode coupled to the regulator, and a second current electrode coupled to the ground terminal.

5. The D.C. to D.C. converter of claim 1 wherein the detector means comprises a comparator circuit having a first input coupled to the reference voltage, a second input coupled to the output of the integrator, and an output terminal for providing the output of the detector means.

6. The D.C. to D.C. converter of claim 1 wherein the logic circuitry comprises a flip-flop circuit having a clock input coupled to the regulator, a data input coupled to a power supply voltage terminal, a reset input coupled to the output of the detector means, and an output coupled to the control terminal of the second switch.

7. The D.C. to D.C. converter of claim 1 wherein the integrator comprises:

a resistor having a first terminal coupled to the input terminal and having a second terminal; and a capacitor having a first electrode coupled to the second terminal of the resistor and a second electrode coupled to the second reference terminal.

8. A method comprising:

receiving an input voltage via an inductor at an input terminal;

storing the input voltage onto a capacitor of an integrator circuit;

making a first switch conductive, the first switch being coupled between the input terminal and a ground, and thereby fluxing the inductor;

making the input voltage stored on the capacitor fall at a rate determined by the integrator circuit and an initial value of the input voltage;

after a time duration, making the first switch nonconductive;

flowing current from the inductor through a diode to an output terminal for providing an output voltage until a second switch across the diode is made conductive;

increasing stored voltage on the capacitor of the integrator in response to the second switch being conductive at a rate that is proportional to the output voltage minus the input voltage;

continuously comparing the stored voltage on the capacitor with a reference voltage; and making the second switch nonconductive when the stored voltage on the capacitor reaches and begins to exceed the reference voltage.

9. The method of claim 8 further comprising:

reducing voltage across the inductor by a diode voltage drop when the second switch is conducting.

10. The method of claim 8 further comprising:

controlling the time duration by a regulator circuit coupled to the first switch.

11. The method of claim 10 further comprising:

enabling a comparator for the continuously comparing by providing an enable signal from the regulator circuit prior to making the first switch conductive.

12. The method of claim 8 further comprising:

implementing the continuously comparing with an autozero capacitor coupled to an inverter which is coupled to a logic gate, the inverter having an equalization transistor selectively coupled between an input and an output thereof for setting a trip point voltage of the inverter to the input voltage.

13. The method of claim 8 further comprising:

implementing the continuously comparing with a comparator circuit coupled to a logic gate, the comparator circuit having a first input coupled to a reference terminal for receiving the reference voltage, a second input coupled to the capacitor of the integrator circuit and having an output coupled to the logic gate.

14. The method of claim 8 further comprising:

coupling a flip-flop between detection circuitry and the second switch, the flip-flop being reset when stored voltage on the capacitor reaches and exceeds the reference voltage to provide a control signal for biasing the second switch.

15. A D.C. to D.C. converter, comprising:

an input terminal for receiving a first terminal of an inductor, the inductor having a second terminal for receiving an input voltage;

a first transistor switch having a first current electrode coupled to a first node, a second current electrode coupled to a ground terminal and a control terminal;

a regulator coupled to the control terminal of the first transistor switch for regulating conduction of the first switch;

a diode having a cathode coupled to the first node and an anode coupled to an output terminal for providing current flow only from the first node to the output terminal;

a second transistor switch having a first current electrode coupled to the cathode of the diode, a control terminal, and a second current electrode coupled to the anode of the diode, the second transistor switch selectively short circuiting the diode;

an RC integrator coupled between the first node and the ground terminal, the RC integrator having an output;

a detector coupled to the output of the RC integrator for detecting when voltage at the output of the RC integrator exceeds a reference voltage, and having an output; and a flip-flop having an input coupled to the output of the detector and an output coupled to the control terminal of the second transistor switch, the flip-flop making the second transistor switch conductive in response to the first transistor switch becoming nonconductive and making the second transistor switch nonconductive in response to determining when capacitor voltage in the RC integrator exceeds the reference voltage.

16. The D.C. to D.C. converter of claim 15 wherein the detector comprises:

a capacitor having a first electrode coupled to the output of the RC integrator, and having a second electrode;

a P-channel transistor having a first current electrode coupled to a power supply voltage terminal, a gate coupled to the second electrode of the capacitor, and a second current electrode coupled to a node;

a first N-channel transistor having a first current electrode coupled to the second current electrode of the P-channel transistor at the node, a gate coupled to the gate of the P-channel transistor, and a second current electrode;

a second N-channel transistor having a first current electrode coupled to the second current electrode of the first N-channel transistor, a gate coupled to the regulator, and a second current electrode coupled to the ground terminal; and a logic gate having a first input coupled to the node, a second input coupled to the regulator, and an output coupled to a reset input of the flip-flop.

17. The D.C. to D.C. converter of claim 15 wherein the reference voltage is a voltage at the output of the RC integrator when the first switch first becomes conductive.

18. The D.C. to D.C. converter of claim 15 wherein the detector comprises:

a comparator circuit having a first input coupled to the output of the RC integrator, a second input for receiving the reference voltage, a third input coupled to the regulator for receiving an enable signal, and an output; and a logic gate having a first input coupled to the output of the detector, a second input coupled to the regulator for receiving the enable signal and an output coupled to the input of the flip-flop.

19. The D.C. to D.C. converter of claim 18 wherein the input of the flip-flop is a reset input.

20. The D.C. to D.C. converter of claim 15 wherein the RC integrator comprises:

a resistor having a first terminal coupled to the input terminal and having a second terminal; and a capacitor having a first electrode coupled to the second terminal of the resistor at the output of the integrator, the capacitor having a second electrode coupled to the ground terminal.

\* \* \* \* \*